United States Patent [19]

Bryan et al.

[11] Patent Number: 5,071,617
[45] Date of Patent: Dec. 10, 1991

[54] REDUCED FLOW RESISTANCE CAST LOWER END FITTING

[75] Inventors: William J. Bryan, Granby; Zeses E. Karoutas, Simsbury, both of Conn.

[73] Assignee: Combustion Engineering, Inc., Windsor, Conn.

[21] Appl. No.: 448,492

[22] Filed: Dec. 11, 1989

[51] Int. Cl.$^5$ .......................................... G21C 15/243
[52] U.S. Cl. ...................................................... 376/352
[58] Field of Search ....................... 376/313, 352, 446

[56] References Cited

U.S. PATENT DOCUMENTS

| Re. 27,950 | 3/1974 | Frisch | 376/442 |
|---|---|---|---|
| 3,212,987 | 10/1965 | Mason | 376/352 |
| 3,481,832 | 12/1969 | Rickert | 376/353 |
| 3,775,249 | 11/1973 | Clapham | 376/446 |
| 4,096,032 | 6/1978 | Mayers et al. | 376/38 |
| 4,427,624 | 1/1984 | Marlatt et al. | 376/352 |
| 4,559,275 | 12/1985 | Matt et al. | 376/352 |
| 4,652,425 | 3/1987 | Ferrari et al. | 376/352 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |
| 4,781,884 | 11/1988 | Anthony | 376/352 |
| 4,832,905 | 5/1989 | Bryan et al. | 376/352 |
| 4,919,883 | 4/1990 | Bryan | 376/313 |

FOREIGN PATENT DOCUMENTS

| 1211342 | 2/1966 | Fed. Rep. of Germany . | |
|---|---|---|---|
| 0102493 | 8/1979 | Japan | 376/313 |
| 1214998 | 12/1970 | United Kingdom | 376/440 |

Primary Examiner—Stephen C. Bentley
Attorney, Agent, or Firm—John H. Mulholland

[57] ABSTRACT

Pressurized water reactor fuel bundles (10) have a cast lower end fitting (20) which provides reduced pressure drop because nozzles (24) are of polygonal (rectangular or square) cross-section and the flow entrance wall portion (32) is a parabolic shape which merges into a wall portion (30) parallel to the flow direction. The parabolic shape of portion (32) and fillets (24a) at the nozzle (24) corners also give an improved draft to the casting. Pressure drop reduction was substantially greater than standard calculations indicated would be obtained.

5 Claims, 4 Drawing Sheets

REDUCED FLOW RESISTANCE CAST LOWER END FITTING

FIELD OF THE INVENTION

This invention relates to nuclear fuel assemblies and in particular those assemblies which include spaced fuel rod support grids mounted in a reactor core as a unit. The fuel rods are held between an upper end fitting and a lower end fitting by means of spacer grids. Guide tubes provide the structural integrity between the lower end fitting, the upper end fitting and the spacer grids intermediate the ends of the fuel assembly. The spacer grids define an array of fuel rods which, typically, may be rows and columns of 16 rods each. One such spacer and support grid is disclosed in U.S. Pat. No. 3,481,832. The reactor coolant flows upwardly through holes or nozzles in the lower end fitting, along the fuel rod lower end caps and upwardly along the fuel rod cladding and through the spacer grids in the active region of the fuel assembly. For a lower end fitting which includes a casting, see U.S. Pat. No. 4,832,905 assigned to the same assignee as the instant invention. The instant invention is a modification of the invention there disclosed.

BACKGROUND OF THE INVENTION

Debris in the coolant which collects or is trapped in fuel rod spacer grids is believed responsible for as many as 30% of known fuel rod failures. Laboratory and in-reactor experience indicate that fuel rod cladding failures can be caused by debris trapped in a grid region which reacts against the fuel rod cladding in a vibratory fashion resulting in rapid wear of the cladding. Devices which will trap a large percentage of debris before it gets to the action area have been designed.

Attempts to treat the debris problem have involved grids in the region of the lower end fitting and the lower rod support grid. One such attempt is the subject of U.S. patent application Ser. No. 020,816 entitled "Debris Catching Strainer Grid", filed Mar. 2, 1987 by Andrew J. Anthony now U.S. Pat. No 4,781,884, and assigned to the assignee of the instant invention. This grid is typically welded to the upper side of the lower end fitting. Other examples of debris strainers, or traps and grids are seen in U.S. Pat. Nos.: Reissue 27,950, 4,684,495; 4,684,496; 4,652,425; 4,678,627, 4,427,624; 4,096,032; and Japanese Application 53-8277, 1-30-1978 (Kokai 54-102493, 8-11-1979); German Auslegeschrift 1,211,342 (Anmeldetag Feb. 2, 1960); and British Patent 1,214,998. None of these attempts have been totally effective for the purpose intended for reasons of compromise between costs, pressure drop during coolant flow and debris retainability.

With increased demand for performance of nuclear fuel, the need to increase flow mixing and reduce debris induced fuel rod fretting failures has given rise to higher flow resistance fuel designs. the C-E GUARDIAN TM Spacer Grid, which is the subject of U.S. patent application Ser. No. 07/284,018, filed Dec. 14, 1988 by william J. Bryan, now U.S. Pat. No. 4,919,883 and assigned to the same assignee as the instant invention, increases fuel assembly pressure drop by 4%. The GUARDIAN grid substantially eliminates debris induced failures by screening flow and trapping debris which causes fuel rod fretting failures. A proposed mixing grid design, which is now under development, will add an additional 15% fuel assembly pressure drop increase. These increases in pressure drop result in core flow penalties which result from the mismatched pressure drop of a mixed fuel assembly designed core. Approximately one-third (166 ) of a core of fuel is transitioned out of the reactor during each refueling. To reduce the pressure increase, an improved hydraulic design lower end fitting has been developed and is the subject of this application.

SUMMARY OF THE INVENTION

Since the problem of added pressure drop required an examination of the coolant flow path throughout the fuel assembly or bundle, it was discovered that upon the coolant flow's first encounter with the nozzles on the upstream lower side of the lower end fitting, more pressure drop than necessary was being created. Calculations and tests have determined that by providing a substantially parabolic first nozzle wall portion at the flow entrance end of the nozzles, a surprising reduction in pressure drop across the lower end fitting is accomplished.

Typically, lower end fittings' nozzles were provided with a straight taper or chamfer of 20° to 25°, when pressure drop at this point was investigated, it was determined by both calculation and testing that a parabolic contour on the first or entrance wall portion of the nozzles reduces pressure drop. This is particularly so when a polygonal, especially rectangular or square, cross-section is given to the nozzles to maximize or optimize the open area of the lower end fitting. An added benefit was discovered during the casting process to make these lower end fittings, namely, the draft for removal from the mold was improved. Filleting of the polygonal "corners" also helped the draft.

Figure 1:
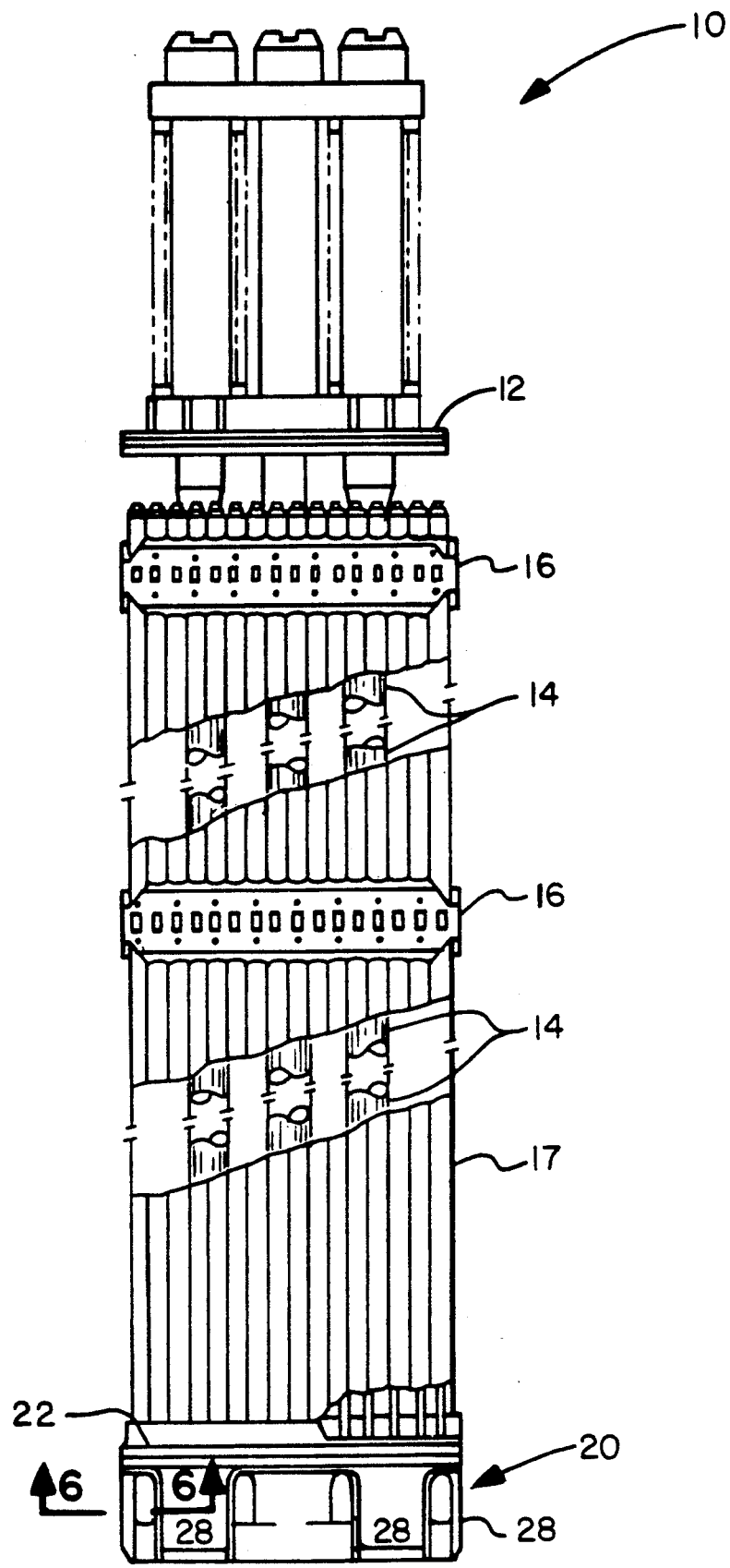
FIG. 1 is a side elevational view of a fuel assembly configuration including the cast lower end fitting of the invention.

PREFERRED EMBODIMENT OF THE INVENTION v The numeral 10 generally designates a nuclear fuel assembly unit for a pressurized water reactor (PWR). The fuel assembly 10 includes an upper end fitting 12, guide tubes 14, spacer grids 16 supporting fuel rods 17, and a novel cast end fitting of INCONEL stainless steel constructed according to the principles of the invention, designated by the numeral 20.

The end fitting 20 includes a top plate or grid 22 made up of an array of generally rectangular nozzles or holes 4 which provide the manifolding of coolant through the fuel assembly 10. At symmetrical locations, typically five, a plurality of hollow bosses 26 are provided into which guide tubes 14 are mounted and fastened. Along the periphery of the grid plate 22, at the corners opposite the hollow bosses 26 are leg members 28 which engage the core plate of the reactor (not shown) to support the fuel assembly.

Each nozzle 24 includes a first side wall portion 30 parallel to the direction of flow and a coolant entrance second wall portion 32 which is substantially parabolic in shape and merges into said first portion to minimize pressure drop of coolant flow through the nozzle 24. Its corners 24a are filleted.

The cast INCONEL lower end fitting 20 is provided an improved casting draft because of the parabolic shape of the nozzle portion 32 and the filleted corners 24a.

Figure 2:
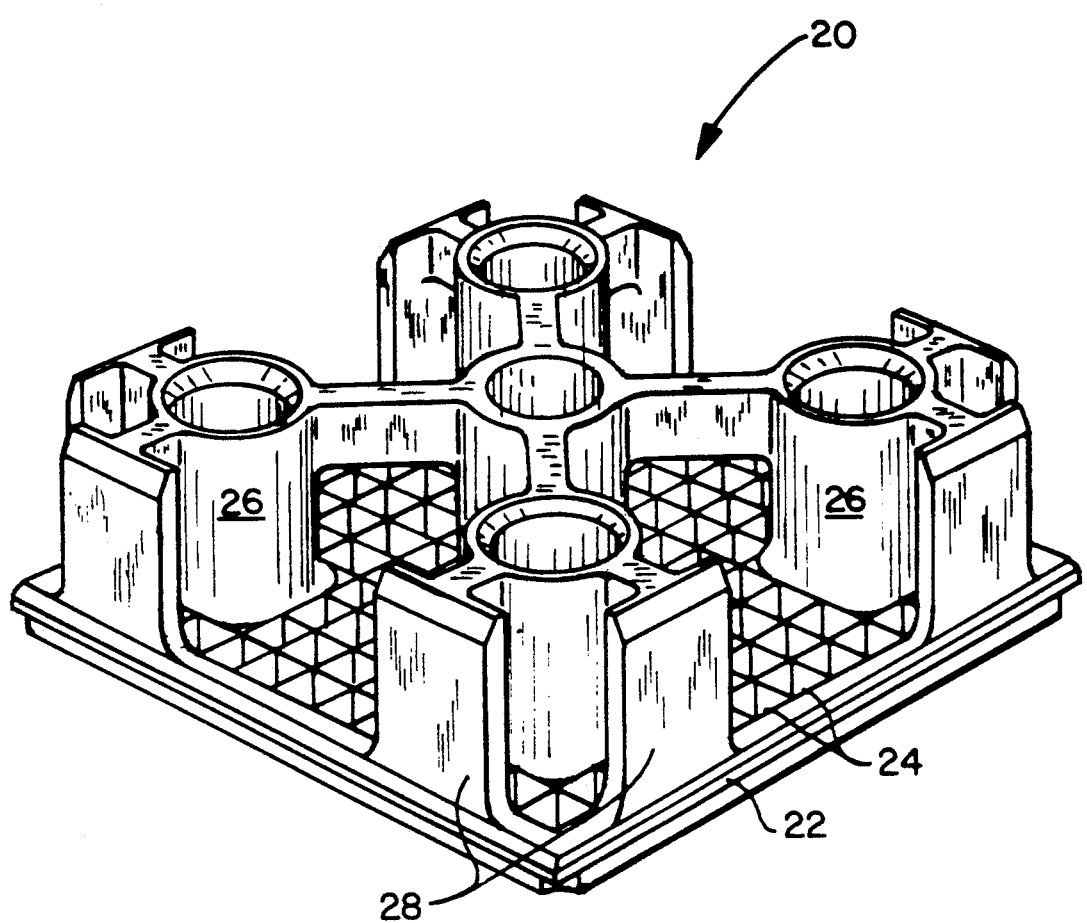
FIG. 2 is a perspective view of the lower end fitting of the invention showing the upstream lower structural features of the casting.
Figure 3:
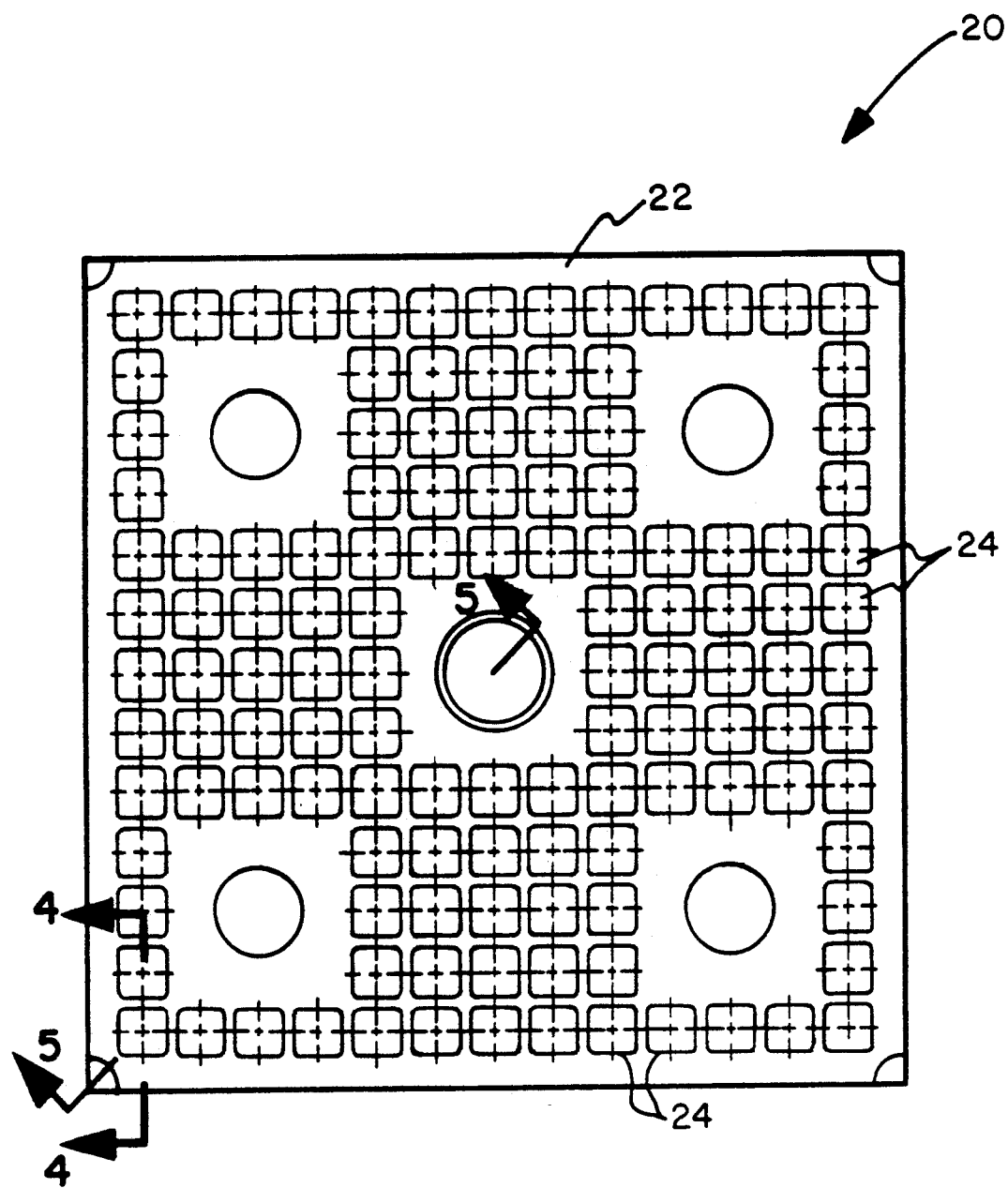
FIG. 3 is a plan view of the lower end fitting casting of FIGS. 1 and 2.
Figure 4:
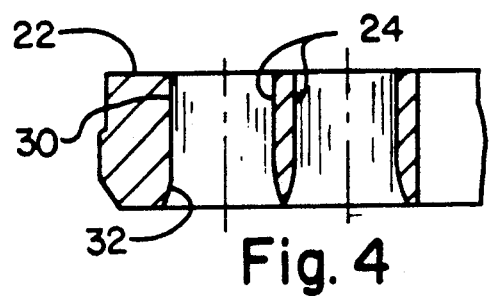
FIG. 4 is a fragmentary cross-sectional view taken along the line 4—4 of FIG. 3.
Figure 5:
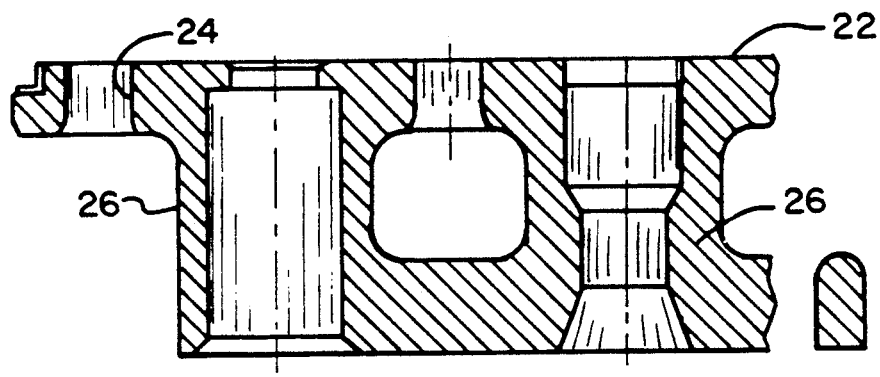
FIG. 5 is a fragmentary cross-sectional view taken along the line 5—5 of FIG. 3.
Figure 6:
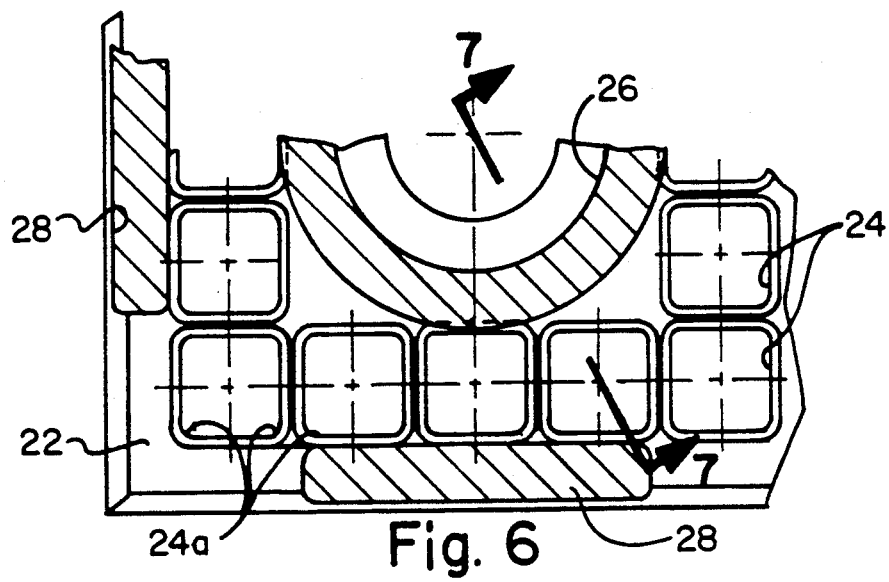
FIG. 6 is a fragmentary cross-sectional view along the line 6—6 of FIG. 1.
Figure 7:
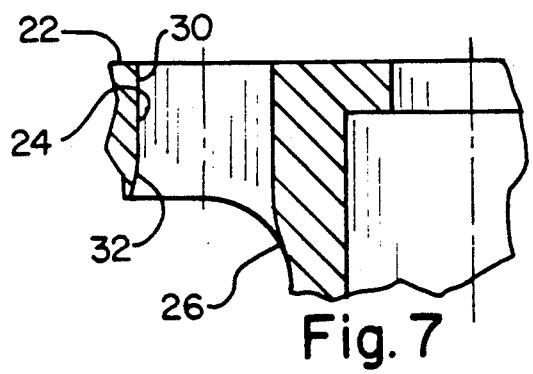
FIG. 7 is a fragmentary cross-sectional view along the line 7—7 of FIG. 6.

The following items and tests to illustrate how the parabolic shape of nozzle portion 32 in combination with the polygonaly-shaped cross-section of nozzles 24 decreases the pressure drop follow In tests, three lower end fitting configurations on fuel bundles were checked for pressure drop loss coefficient expressions. They were, respectively, known as the "baseline (std.)" with no debris trapping features; the "GUARDIAN TM "; and the "GUARDIAN with square LEF" (having the configuration of FIGS. 1-7). The overall loss coefficient for the baseline bundle was 9.8.

The GUARDIAN TM, which is currently sold by the assignee of the invention as an improved debris trapping grid and lower end fitting combination, and is the subject matter of co-pending U.S. patent application Ser. No. 07/279,687 filed Dec. 5, 1988, had an increase in loss coefficient of 0.419 when compared to the "baseline" or standard lower end fitting without the debris trapping improvements, which was assigned a 0.000 increase in loss coefficient for the tests. Thus, the increase in loss coefficient for the GUARDIAN TM was 0.419 or 4.3% from the overall average of 9.8% for the test geometry. $(0.419 \div 9.8 = 4.3\%)$ The "GUARDIAN with square LEF" (lower end fitting holes) of FIGS. 1-7 of the instant application provided an increase in loss coefficient of only 0.080 or 0.8% for the test geometry. $(0.080 \div 9.8 = 0.8\%)$ The important fact is that the structure of the FIG. 1-7 lower end fitting and debris trapping grid combination, as opposed to the GUARDIAN TM lower end fitting and debris trapping combination, where both used the same debris trapping grid and only the lower end fittings were different, gave a 0.8% loss coefficient penalty for debris trapping features instead of a 4.3% loss coefficient penalty for debris trapping features over the baseline with no penalty, i.e., a 0.000 loss coefficient for the tests. Accordingly, the loss coefficient reduction from 4.3% to 0.8% is a 81% penalty reduction. $(3.5 \div 4.3 = 81\%)$.

We claim:

1. In a pressurized water nuclear reactor having fuel assemblies through which coolant flows including an upper end fitting, spaced nuclear fuel rod spacer grids for supporting and spacing a plurality of elongated nuclear fuel rods and a lower end fitting, the improvement comprising:

said lower end fitting being of a body of material defining open areas including coolant flow nozzles, each with a first side wall portion parallel to the direction of flow and a coolant entrance second side wall portion which is substantially parabolic in shape and merges into said first portion to minimize pressure drop of coolant flow through the nozzle and said nozzles having the cross-section of a polygon with filleted corners to maximize the open area of the lower end fitting.

2. The improved lower end fitting of claim 1 in which the body of material is a casting and the second side wall portion which is substantially parabolic in shape provides and improved casting draft.

3. The improved lower end fitting of claim 2 in which the casting is of stainless steel.

4. The improved lower end fitting of claim 2 in which the casting includes, legs and bosses with guide tube openings.

5. The improved lower end fitting of claim 1 in which the nozzles are substantially rectangular in cross-section normal to the direction of flow.

* * * * *